United States Patent Office

3,531,464
Patented Sept. 29, 1970

3,531,464
ALTERNATIVE SYNTHESIS OF 2'-DEOXY-5-(TRI-FLUOROMETHYL)-URIDINE AND THE ALPHA-ANOMER THEREOF
Kenneth J. Ryan, Redwood City, Edward M. Acton, Menlo Park, and Leon Goodman, Palo Alto, Calif., assignors to the United States of America as represented by the Secretary of the Department of Health, Education and Welfare
No Drawing. Filed Oct. 21, 1966, Ser. No. 588,284
Int. Cl. C07d 51/52
U.S. Cl. 260—211.5                                         5 Claims

ABSTRACT OF THE DISCLOSURE 2-deoxy-5-(trifluoromethyl) uridine and its alpha-anomer are prepared by condensing 5-(trifluoromethyluracil, as the bis-(trimethylsilyl) derivative, with 3,5-bis-(p-nitrobenzoate) of 2-deoxyribo-furanosyl chloride, in benzene in the presence of mercuric acetate, and deacylating p-nitrobenzoate esters resulting from said condensation. Cooperating separation and deacylation steps are also disclosed.

---

The present invention relates to the synthesis of 2'-deoxy - 5-(trifluoromethyl)-uridine and the alpha-anomer thereof, and aims to provide a new and improved chemical process for effecting such syntheses.

The compound 2'-deoxy - 5-(trifluoromtehyl)-uridine is itself a known compound of known utility, which has heretofore been prepared from 5-trifluoromethyluracil with the aid of an enzyme obtained from *E. coli* bacteria (Heidelberger U.S. Pat. No. 3,201,387 issued Aug. 7, 1965, Example 6). The present invention provides a new process for producing the compound 2'-deoxy-5-(trifluoromethyl)-uridine, and/or the alpha-anomer thereof, from the 5-trifluoromethyl-uracil, which new process is a chemical (as contrasted with an enzyme) synthesis, and the invention will be best understood by initial reference to the general procedures and identification of the compounds and intermediates leading thereto in connection with the accompanying diagrams, followed by consideration of the appended more detailed quantitative exemplification of the process.

The diagrams of Table I constitute a generalized chart illustrating the syntheses and intermediates of the new method of the present invention for producing the 2'-deoxy-5-(trifluoromethyl)-uridine.

Briefly, the new method or process of the present invention comprises (a) subjecting 5-(trifluoromethyl)uracil, as the bis(trimethylsilyl) derivative, to condensation with the 3,5-bis(p-nitrobenzoate) of 2-deoxy-ribofuranosyl chloride, thereby producing α,β-nucleoside, from which the respective anomers may be separated, and (b) mild deacylation of at least a part of the esters thus produced.

In the embodiment more particularly illustrated in Table I, the invention was put into practice as follows: (a) 5-trifluoromethyluracil (2)—which may be prepared by known methods, e.g. that disclosed in said Heidelburger patent—by appropriate procedures (e.g. that hereinafter exemplified) was converted to its bis-(trimethylsilyl)-derivative (6). This derivative (6) was subjected to a condensation reaction with blocked sugar comprising easily saponified aroyl ester for protection of the sugar hydroxyls, e.g. 2-deoxy - 3,5-bis-O-(p-nitrobenzoyl)-D-ribofuranosyl-chloride (8), under suitable conditions, e.g. with benzene as solvent and mercuric acetate as acid acceptor. As the reaction proceeded, the benzene solution became supersaturated in nucleoside (13) both anomers of which slowly precipitated on standing. The optimum reaction period was 15 to 18 hours. The α:β ratio in crude (13) was 1:2 and the β-anomer was separated by a slow crystallization of this derivative of the desired 2'-deoxy-5-(trifluoromethyl)-uridine. The mother liquor contained the anomers α-13 and β-13 in a nearly even ratio. The α-anomer α-13 was isolated as an amorphous powder by preparative thin layer chromatography (tlc).

Methanolysis of the p-nitrobenzoate esters from either anomer was accomplished by boiling α-13 or β-13 briefly with methanolic diisopropylamine until completely dissolved. The free nucleoside was then obtained with the $CF_3$ group intact, but was at least partly a salt of diisopropylamine because of the increased acidity of the heterocyclic N—3—H in β-14 (or in α-14) as compared to thymidine. Conversion to the uracil free base was completed by regeneration with an ion-exchange resin (H) in aqueous solution. The 2'-deoxy-5-(trifluoromethyl)-uridine β-14 was obtained from the bis-p-nitrobenzoate β-14 in quantitative yield, and the extinction of the ultraviolet maximum indicated essentially complete purity. Absence of any shift in the maximum toward longer wavelengths showed no methanolysis of the $CF_3$ group to COOMe had occurred during the mild methanolysis of the ester groups in β13.

The crystalline α anomer α-14 was obtained from the amorphous diester α-13. The tlc resolution of β-14 and α-14 permitted either anomer to be declared free of the other, as was confirmed by nuclear magnetic resonance (n.m.r.) studies.

While the essence of the invention will be evident to those skilled in the art from the foregoing general description, a further understanding of a mode of practicing the same will be best obtained from the following specific

TABLE I

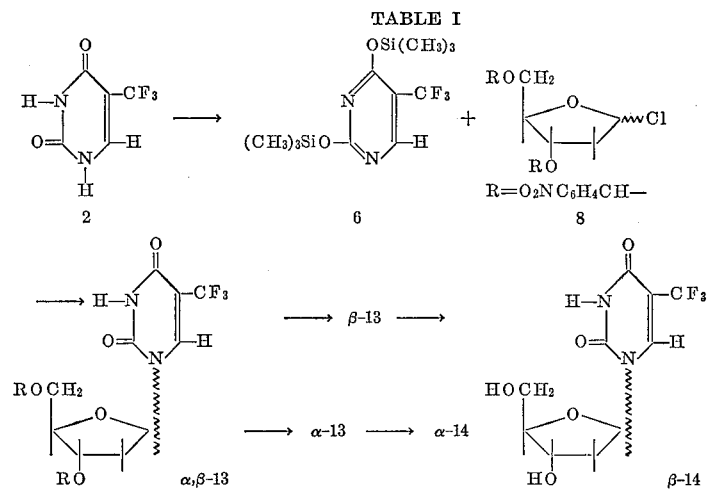

examples of presently preferred modes of carrying out the several steps of the process, wherein the underlined numerals refer to the diagram of Table I:

EXAMPLE 1

Production of bis(trimethylsilyl)-5-(trifluoromethyl) uracil (6)

A mixture of 15.5 g. (86.0 mmoles) of 2, 50 ml. of hexamethyldisilazane, and 1 ml. of chlorotrimethylsilane, protected from moisture, was refluxed (bath temperature 150-170°) for 1 hr. while ammonium chloride (which precipitated almost immediately) sublimed and was allowed to collect in the condenser. The resultant clear solution was cooled and concentrated at 1 mm. (bath temperature not above 50-60°). The residual oily 6 could be distilled, but was more conveniently used without distillation because of high sensitivity to atmospheric moisture. Weights were 120-170% of theory, owing to the presence of unremoved starting materials and by-products. Any cloudiness in the oil was suggestive of some hydrolysis to 5-(trifluoromethyl)uracil.

EXAMPLE 2

Production of 3',5'-bis-O-(p-nitrobenzoyl)-2'deoxy-5-(trifluoromethyl)uridine ($\beta$-13)

A solution of 12.5 g. (27.8 mmoles) of chloro sugar 8 in 750 ml. of benzene (dried over calcium hydride) was treated with a solution of 15.0 g. of residual oily 6 (166% of theory from 5.00 g., 27.8 mmoles, of 2) in 25 ml. of dried benzene. To the clear solution (any cloudiness suggests hydrolysis of 6) was added 9.0 g. of mercuric acetate (Mallinkrodt analytical reagent, 98.0-100.1%). The suspension was stirred for 18 hrs. at 25°, and then was poured through a filter slowly so that the mixture did not accumulate in the funnel. The filter cake was washed with 200 ml. of benzene; the small amount of $\alpha$, $\beta$-13 remaining with these inorganics could not be recovered (if the reaction mixture stood for several days, or was filtered rapidly, considerable amounts of $\alpha$, $\beta$-13 precipitated and were lost on the filter). The filtrate was supersaturated in $\alpha$, $\beta$-13 and partial precipitation occurred. The mixture was concentrated and the residual glass was powdered and triturated with 300 ml. of aqueous 30% potassium iodide, then with two 300-ml. portions of water. The glass was dissolved in 250 ml. of acetone, clarified by filtration through Celite, and concentrated to form 21 g. (127% yield, soluble mercuric salts were still present) of $\alpha,\beta$-13 as a foamed glass. Both anomers were observed on tlc, the $\alpha$:$\beta$ ratio was 1:2 by $^{19}$F n.m.r. spectroscopy. Thin layer chromatography (tlc) was carried out with silica gel HF on glass plates (5 x 20 cm.) in ethyl acetate-methanol-water-n-heptane (10:6:5:3), upper phase. Spots were detected under ultraviolet light. The $\alpha$ anomers moved a little slower than, and separate from, the $\beta$ anomers. Absolute $R_f$ values varied considerably from plate to plate, but relative values were reproducible.

This crude product was dissolved in 80 ml. of 2-heptanone, and methanol (ca. 180 ml.) was added just to incipient cloudiness. Crystals began to form within 1-2 hr. After 6 days at 25° the mixture had deposited 6.18 g. of $\beta$-13, M.P. 140-144°, containing a faint trace of $\alpha$-13 by tlc. This was dissolved in 20 ml. of warm 2-heptanone by adding 20 ml. of acetone, the acetone was removed in vacuo, the heptanone solution was filtered through Celite, and the Celite was washed with 5 ml. of heptanone. The filtrate was diluted with 60 ml. of methanol. After 18 hrs. at 0-5°, 5.44 g. (33%) was obtained: M.P. 142-144°; $[\alpha]_D^{22}$+5.6±1.0° (dimethylformamide); $R_f$ 0.64; n.m.r. data, $\gamma$ 1.80 s. (p—$C_6H_4$—), 3.72 t. (C-1' H), 4.25 q. (C-3' H), 5.1-5.3 broad (C 4' H), 5.20 s. (C-5' H), and 7.10 q. (C-2' H); 64.0 s. (—CF$_3$) p.p.m.

*Analysis.*—Calcd. for $C_{24}H_{17}F_3N_4O_{11}$ (percent): C, 48.5; H, 2.88; F, 9.59; N, 9.44. Found (percent): C, 48.2; H, 3.32; F, 9.64; N, 9.23.

The mother liquor from the initial crystallization of $\beta$-13 was concentrated to form a residual glass (14.5 g.). Further separation could not be accomplished by crystallization techniques. Excessive weight indicated some soluble mercuric salts were also present. The amount of $\alpha$, $\beta$-13 present was determined by deacylation (by the procedure for $\beta$-14, below) and measurement of the ultraviolet extinction of the crude $\alpha$, $\beta$-14; in this way the overall yield of nucleoside from the condensation was estimated at 86%.

EXAMPLE 3

Production of 1-[3,5-bis-O-(p-nitrobenzoyl)-2-deoxy-$\alpha$-D-ribofuranosyl)]-5-(trifluoromethyl)uracil ($\alpha$-13)

A 2.8-g. portion of the above residual glassy 13 (14.5 g., $\alpha$:$\beta$ ratio 1:1) was subjected to chromatography on 14 glass plates (20 x 20 cm.) containing 2-mm. layers of silica gel. Crude $\alpha$-13 (1.3 g.) was eluted with acetone. A second pass with seven plates afforded 0.75 g. (23% yield) of $\alpha$-13 of 90% purity, by n.m.r., containing a little $\beta$-13. Chromatographically homogeneous $\alpha$-13, $R_f$ 0.75, could be obtained by a third chromatographic separation, or by taking more selective cuts of absorbent from the second pass. The amorphous powder could not be crystallized: $[\alpha]_D^{23}$—40.2±1.4° (dimethylformamide): n.m.r. data, $\gamma$ 1.70 s. and 1.79 s. (p—$C_6H_4$—), 3.56 q. (C-1' H), 4.12 d. (C-3' H), 4.62 t. (C-4' H), 5.31 d. (C-5' H), and 6.5-7.4 m. (C-2' H); 63.5 s. (—CF$_3$) p.p.m.

*Analysis.*—Found (percent): C, 48.6; H, 3.20; F, 9.24; N, 9.22.

EXAMPLE 4

Production of 2'-deoxy-4-(trifluoromethyl)-uridine ($\beta$-14)

A suspension of 4.00 g. (6.75 mmoles) of $\beta$-13 in 250 ml. of methanol was treated with 10 ml. of diisopropylamine and refluxed until $\beta$-13 had dissolved (ca. 18 min.), and the solution was concentrated. The dry residue was partitioned between 50 ml. of chloroform and 50 ml. of water. The chloroform layer was washed with 20 ml. of water, and the combined aqueous layers were concentrated. A low ultra-violet extinction ($\epsilon$7200 and 262 m$\mu$; pH 1) and the presence of isopropyl signals in the n.m.r. spectrum (two singlets at $\gamma$8.73 and 8.85) indicated the dry residue contained diisopropylamine, probably as a salt with the relatively acidic heterocyclic N—H in 14. A solution in 75 ml. of water was treated with 8 ml. (volume of resin) of Dowex 50 (H), pre-washed with water and methanol. The resin was removed on a filter and washed with 25 ml. of methanol and 50 ml. of water. The combined filtrate was evaporated in vacuo to form 1.99 g. (100%), M.P. 171-175°, $$\lambda_{max.}^{pH 1}\ 262\ m\mu\ (\epsilon 9580)$$

chromatographically homogeneous by tlc, $R_f$ 0.64, identical with that of a sample prepared by the enzymatic process. Reprecipitation by concentrating an ethyl acetate solution afforded 1.18 g. (58% yield) in two crops: M.P. 177-179°; $[\alpha]_D^{20}$+46.9±1.4° (water);

$$\lambda_{max.}^{pH 1}\ 262\ m\mu\ (\epsilon 10,200);\ \lambda_{max.}^{pH 7}\ 262\ m\mu\ (\epsilon 9800);$$

$$\lambda_{max.}^{pH 11}\ 260\ m\mu\ (\epsilon 6930)$$

n.m.r. data, $\gamma$—0.60 (NH), 1.23 s. (C-6 H slightly split by CF$_3$), 3.73 t. (C-1' H), and 7.62 t. (C-2' H); 64.6 (CF$_3$) p.p.m. The mixture melting point with the enzymatically prepared sample (M.P. 181-184°) was also 181-184°.

*Analysis.*—Calcd. for $C_{10}H_{11}F_3N_2O_5$ (percent): C, 40.5; H, 3.74; F, 19.2; N, 9.45. Found (percent): C, 40.4; H, 3.68; F, 19.1; N, 9.46.

EXAMPLE 5

Production of 1-(2-deoxy-α-D-ribofuranosyl)-5-(trifluoromethyl)uracil (α-14)

The same procedure was used to deacylate 0.75 g. of α-13.

The product was crystallized from acetone-chloroform to give 0.14 g. of chromatographically homogeneous α-13; $R_f$ 0.56; M.P. 175—178°; $[\alpha]_D^{21}$—17.4±1.0° (water);

$\lambda_{max.}^{pH\,1}$ 262 m$\mu$ ($\epsilon$9830); $\lambda_{max.}^{pH\,7}$ 262 m$\mu$ ($\epsilon$9320);

$\lambda_{max.}^{pH\,13}$ 260 m$\mu$ ($\epsilon$6730)

n.m.r. data, γ—0.40 (NH), 1.55 (C–6 H, weakly split by CF$_3$), 3.78 q. (C–1' H), and 7.0–7.8 m. (C–2' H); 64.0 s. (CF$_3$) p.p.m.

An additional 0.04 g. (total yield 0.18 g., 43%) was recovered from the mother liquor by preparative tlc.

*Analysis.*—Found (percent): C, 40.8; H, 3.81; F, 19.0; N, 9.34.

Publication has been made of subject matter of the present invention within the year next preceding the execution of the present specification as follows: Jou. of Org. Chem., vol. 31, pages 1181–1184 (1966), and the disclosure in said publication is made a part hereof by reference and may be consulted for further details and comments on the invention.

While there have been described herein what are at present considered preferred embodiments of the invention, it will be obvious to those skilled in the art that modifications and changes may be made without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What is claimed is:

1. A chemical process for the production of a compound of the class consisting of 2'-deoxy-5-(trifluoromethyl)uridine and the alpha-anomer thereof, which process comprises:
   (a) condensing in the presence of mercuric acetate 5-(trifluoromethyl)uracil, as the bis-(trimethylsilyl) derivative, with 3,5-bis-(p-nitrobenzoate) of 2-deoxyribofuranosyl chloride, and
   (b) deacylating p-nitrobenzoate esters resulting from said condensation at least in part by boiling the p-nitrobenzoate esters with methanolic diisopropyl amine until dissolved.

2. A process as claimed in claim 1, in which the beta-anomer produced in step (a) is separated from the alpha-anomer and separately converted by step (b) to the 2'-deoxy-5-(trifluoromethyl)uridine.

3. A process as claimed in claim 2 in which the condensation of step (a) is effected in benzene, and the separation of the beta-anomer is effected at least in part by slow crystallization from the reaction product of step (a).

4. A process as claimed in claim 1 in which the alpha-anomer produced in step (a) is separated from the beta-anomer by preparative thin layer chromatography.

5. A process as claimed in claim 1 in which step (b) is effected at least in part by regeneration with an ion-exchange resin (H) in aqueous solution.

References Cited

UNITED STATES PATENTS

| | | | |
|---|---|---|---|
| 3,208,997 | 9/1965 | Iwai et al. | 260—211.5 |
| 3,328,389 | 6/1967 | Shimizu et al. | 260—211.5 |
| 3,352,849 | 11/1967 | Shen et al. | 260—211.5 |

OTHER REFERENCES

Hoffer "Jour. Amer. Chem. Soc.," vol. 81, Aug. 5, 1959, pp. 4112–4113.

LEWIS GOTTS, Primary Examiner

J. R. BROWN, Assistant Examiner